(12) United States Patent
Ozugur et al.

(10) Patent No.: US 8,693,482 B2
(45) Date of Patent: Apr. 8, 2014

(54) APPARATUS, AND ASSOCIATED METHOD, FOR FACILITATING MULTI-MEDIA SERVICE IN AN ETHERNET NETWORK

(75) Inventors: Timucin Ozugur, Fairview, TX (US);
Sig Hal Badt, Jr., Richardson, TX (US);
Jessy Rouyer, Fort Worth, TX (US);
Ljubisa Tancevski, Dallas, TX (US)

(73) Assignee: Alcatel Lucent, Paris (FR)

( * ) Notice: Subject to any disclaimer, the term of this patent is extended or adjusted under 35 U.S.C. 154(b) by 736 days.

(21) Appl. No.: 11/619,225

(22) Filed: Jan. 3, 2007

(65) Prior Publication Data

US 2008/0159304 A1 Jul. 3, 2008

(51) Int. Cl.
*H04L 12/54* (2013.01)
*H04H 60/89* (2008.01)
*H04L 29/06* (2006.01)

(52) U.S. Cl.
USPC ............................ 370/401; 370/432; 709/226

(58) Field of Classification Search
USPC ......................................... 370/230, 390, 392
See application file for complete search history.

(56) References Cited

U.S. PATENT DOCUMENTS

| | | | | |
|---|---|---|---|---|
| 5,394,402 | A * | 2/1995 | Ross | 370/402 |
| 5,684,800 | A * | 11/1997 | Dobbins et al. | 370/401 |
| 5,959,989 | A * | 9/1999 | Gleeson et al. | 370/390 |
| 5,959,990 | A * | 9/1999 | Frantz et al. | 370/392 |
| 6,654,720 | B1 * | 11/2003 | Graham et al. | 704/270 |
| 7,355,998 | B2 * | 4/2008 | Briancon et al. | 370/328 |
| 7,477,632 | B1 * | 1/2009 | Radhakrishnan et al. | 370/338 |
| 7,724,704 | B2 * | 5/2010 | Simons et al. | 370/329 |
| 2002/0009083 | A1 * | 1/2002 | Ambe et al. | 370/390 |
| 2002/0052966 | A1 * | 5/2002 | Isomura et al. | 709/230 |
| 2003/0135552 | A1 * | 7/2003 | Blackstock et al. | 709/205 |
| 2003/0137979 | A1 * | 7/2003 | Hayon et al. | 370/392 |
| 2004/0158872 | A1 * | 8/2004 | Kobayashi | 725/120 |
| 2006/0239190 | A1 * | 10/2006 | Kumar et al. | 370/230 |
| 2007/0280230 | A1 * | 12/2007 | Park | 370/390 |
| 2008/0013481 | A1 * | 1/2008 | Simons et al. | 370/328 |

* cited by examiner

*Primary Examiner* — Marsha D Banks Harold
*Assistant Examiner* — Matthew Campbell
(74) *Attorney, Agent, or Firm* — Garlick & Markison (57) ABSTRACT

Apparatus, and an associated method, for facilitating performance of multi-media, and other communication, services at an Ethernet network. A bridge provides communication control operations at the Ethernet network. Audio-video bridge domains are defined at the network. Service discovery messages generated by communication devices of a particular domain are forwarded only to other communication devices of the same domain. Redefinition and reconfiguration of the domains is made, as needed, all best to facilitate performance of the communication service.

20 Claims, 4 Drawing Sheets

APPARATUS, AND ASSOCIATED METHOD, FOR FACILITATING MULTI-MEDIA SERVICE IN AN ETHERNET NETWORK

The present invention relates generally to a manner by which to facilitate multi-media services at an Ethernet network. More particularly, the present invention relates to apparatus, and an associated method, by which to provide AVB (audio-video bridge) domains defined by an audio-video bridge. A communication device positioned at an audio-video bridge-defined domain is able to discover another communication device within the same domain, but is prohibited from discovering a communication device in another domain. The use of audio-video bridging permits a domain easily to be defined, and, if desired, redefined.

BACKGROUND OF THE INVENTION

Advancements in digital communication technologies have permitted the development of many new types of communication systems that provide many new types of communication services. To facilitate communication in such new communication schemes, standard communication schemes have been promulgated. The standardized communication schemes set forth, amongst other things, standardized formatting protocols by which to format data that is communicated during operation of various such communication systems.

Local Area Networks (LANs), for instance, are exemplary of communication systems that have been made possible as a result of advancements in digital communication techniques. In general, a local area network is formed of a group of interconnected communication devices, such as computer work stations, between which communication of data is permitted. A networking technology, referred to as the Ethernet, has been standardized, such as in the IEEE 802.3 family of standards, by which to communicate data between the communication devices of an Ethernet network.

With continued advancements, increasingly data-intensive communication services are possible. Multi-media communication services, for instance, provide for the communication of two or more types of data, such as audio data together with video data. Multimedia communication services generally are required to be effectuated with little latency. Real-time, streaming applications, for instance, require low latency, and the communication scheme utilized by which to communicate multimedia data that forms the real-time streaming application must permit the data to be communicated with little, or no, delay. Not only must the data be communicated with low latency, but the data must be communicated in a manner that meets a service quality level, e.g., a QOS (quality of service) level.

A proposal for use of an audio/video bridge (AVB) in an Ethernet network, an "AVB Ethernet", is being considered by the IEEE (Institute of Electrical and Electronic Engineers). The proposal is intended to enhance multimedia isochronous applications so as to facilitate their effectuation. Various aspects of the AVB Ethernet remain to be resolved.

For instance, aspects pertaining to timing and synchronization remain to be resolved as well as also admission control procedures and requirements. With respect to admission control, a method is proposed, referred to as a stream reservation protocol (SRP). The SRP provides a protocol that permits bridges to guarantee the resources that are required for audio/video (AV) streams based upon a generic attribute reservation protocol (GARP). Additionally, proposals related to frame forwarding rules are also undergoing consideration. The proposals related to the frame forwarding rules generally enhance existing, standard IEEE 802.1 bridge frame forwarding rules to support communication of AV streams together with QOS guarantees for their communication period.

Service discovery procedures are not presently under active consideration. Service discovery procedures, generally UPnP-based, pertain to manners by which to discover the types and capabilities of communication devices within the AVB network. Service discovery procedures are needed to permit communication devices at a network, that is, connected to form portions thereof, to discover other such communication devices, thereafter to be able to perform multimedia communication services therebetween. An Ethernet network might, its entirety, be quite large and include a large number of communication devices. If no constraints are placed upon the service discovery procedures, a communication device might attempt to discover every other communication device of the Ethernet network. In some situations, such broad discovery capability is not desired and can be disadvantageous.

For instance, dormitory rooms of a school dormitory might include AVB Ethernet outlets, permitting a dormitory resident to plug a communication device into a connection with an AVB Ethernet. In an example in which the communication device forms a digital music player, discovery of a speaker, i.e. an acoustic transducer, also connected to the AVB Ethernet network would permit play out of the stored music files for the dormitory resident's listening enjoyment. If the music player performs service discovery procedures throughout the entire AVB Ethernet network, discovery of a speaker connected at another dormitory room and play out of the music at a speaker of the other dormitory room might occur. Such playout would, of course, generally be inappropriate and not wanted. In this example, then, discovery would be preferred to be limited to the same dormitory room at which the music player is connected.

An Ethernet network is able to be divided through use of a gateway in which the gateway functions to bound the service discovery, and other, messages, generated by a communication device. Use of a gateway, however, is relatively costly, and, also, its configuration and management is relatively complex.

If an improved manner could be provided by which to bound service discovery, and other, messages generated by a communication device of an Ethernet network, improved services could be provided.

It is in light of this background information related to communication networks that provide for communication services that the significant improvements of the present invention have evolved.

SUMMARY OF THE INVENTION

The present invention, accordingly, advantageously provides apparatus, and an associated method, by which to facilitate multimedia, and other communication, services at an Ethernet network.

Through operation of an embodiment of the present invention, audio/video bridging domains are provided, their boundaries defined by an audio/video bridge of an AVB Ethernet network.

Communication devices are connected in the Ethernet network at an AVB domain. Service discovery requests generated by communication devices connected at an AVB-defined domain are forwarded to other communication devices within the same domain. These service discovery requests are, however, prohibited from being forwarded onto other domains, thereby limiting service discovery to discovery of communication devices connected at the same domain.

In another aspect of the present invention, an audio/video bridge is positioned at the Ethernet network. The audio/video bridge provides switching functions in the Ethernet network and, e.g., selectively relays data between communication devices of the Ethernet network. Operation of the audio/video bridge circuit further defines the domains of the Ethernet network. Two or more domains are defined at the network, e.g., dividing the network into two or more subparts or domains.

In another aspect of the present invention, the domains are defined by an AVB (audio/video bridge) switch and formed of the subparts of the network are redefinable. That is to say, the prior-defined domains are reconfigurable, if desired, to create newly-defined domains. Small domains are reconfigurable into larger domains and, analogously, large domains are redefineable into smaller domains. When redefined, the service discovery request messages generated by communication devices are forwarded to communication devices of the newly-defined domain. Communication devices available to be discovered are thereby dependent upon the definition, or redefinition, of the domains. In other words, domains are merged or separated through their redefinition. Merging of domains is simply and easily performed, permitting domains to be redefined for short periods of time and then again redefined so that the domains are returned to their original definitions. For instance, a typical conference facility includes conference rooms that are configurable into several small rooms or one large room. The conference room size is selected to be of seating capacity conforming to the numbers of people in attendance at a conference. If additional seating is required, the configuration of the conference room is altered to provide additional seating. A domain is defined, first for the conference rooms of small dimensions. And, redefinition of the domain, to include the additional space associated with the additional seating is made so that communication devices connected to the AVB Ethernet network are able to discover other devices within the newly-defined domain corresponding to the enlarged conference room. In general, definition, and dynamic redefinition of the domains is provided.

In another aspect of the present invention, the individual AVB domains are defined with an identifier, analogous to a VLAN (Virtual Local Area Network) tag. Communication devices of a domain are identified with a tag identifier. A communication device that sends a service discovery message pursuant to a service discovery procedure includes the tag as part of the service discovery message. The service discovery messages are forwarded to the AVB switch that in turn, forwards on the message to ports associated with the tag.

In another aspect of the present invention, the AVB switch includes a filter, or otherwise provides filtering functionality. Filtering filters out certain service discovery messages to prevent their forwarding and permits forwarding of other service discovery messages. Service discovery messages generated pursuant to service discovery procedures are forwarded only to other communication devices in the same domain at which the originating communication device is located.

Thereby, service discovery is permitted by communication devices only in the domain at which the originating communication device is located. The domain is definable and redefinable, as desired, thereby to permit service discovery of communication devices to facilitate effectuation of a communication service. Multimedia communication services are thereby better optimized as service discovery, and subsequent communication of a multimedia service, is permitted only between appropriate ones of the communication devices. In these and other aspects, therefore, apparatus, and an associated method, is provided for facilitating performance of a multimedia communication service between communication devices at an Ethernet network. An audio/video bridge is configured selectably to relay multimedia communication data communicated at the Ethernet network. A first domain is formed of a first portion of the Ethernet network. The first portion forms the first domain defined by the audio/video bridge. Service discovery is permitted between communication devices at the first domain. A second domain is formed of a second portion of the Ethernet network. A second portion that forms the second domain is defined by the audio/video bridge. Service discovery is permitted between communication devices at the second domain. In a further aspect, the Ethernet is further divisable into additional numbers of portions with service discovery permitted within each of the portions between the communication devices of the respective domains defined therefrom.

DETAILED DESCRIPTION

Figure 1:
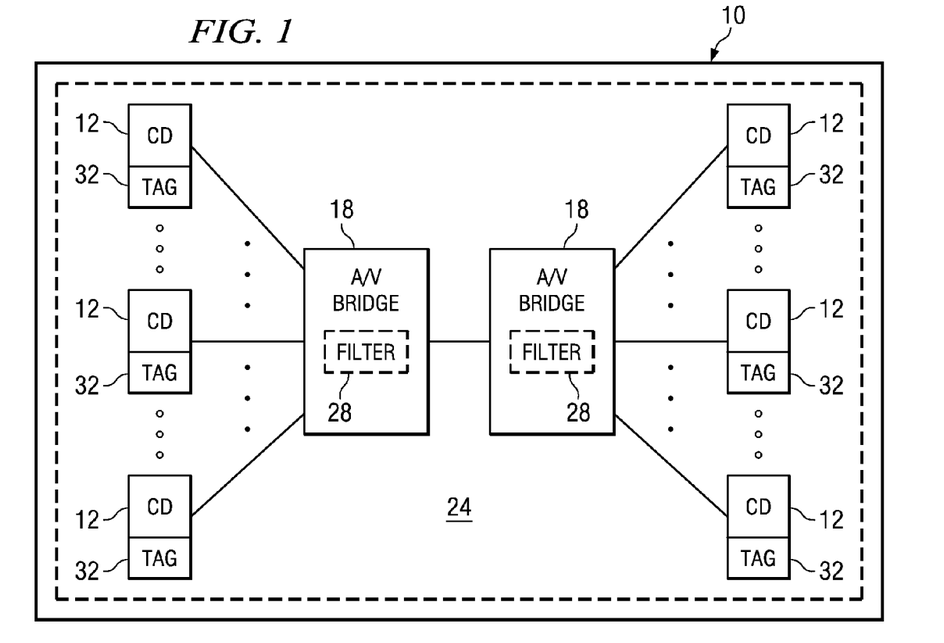
FIG. 1 illustrates a functional block diagram of an Ethernet network in which an embodiment of the present invention is operable.

Turning first to FIG. 1, a communication network, shown generally at 10, provides for communication of data between communication devices, of which a plurality of communication devices 12 are shown in the figure. In the exemplary implementation, the network then forms an Ethernet network and provides for packet-based data communications between the communication devices in which a standardized frame formatting scheme is utilized.

The following description shall describe exemplary operation of the communication network with a respect to its exemplary implementation as an Ethernet network in which formatting and protocols used to communicate in an Ethernet configuration are utilized. The following description of exemplary operation is therefore by way of example only and not by way of limitation.

In an exemplary implementation, multi-channel protocols are provided by which to communicate data pursuant to a multi-media communication service between communication devices. Multi-media communication services are performed between communication devices are of many varied types, for instance, voice services, interactive audio/video communications, combined sound and image communications, and other communication services that are data-consumptive and benefiting of multi-channel availability upon which to communicate data pursuant to the communication service. And, more particularly, isochronous applications and services are provided at the network 10. The network shall, at times, be referred to as an ISO Ethernet network.

The communication devices 12 form, e.g., computer work stations that are appropriately connected, that is, internetworked, with the Ethernet network, thereby to permit multimedia data originated at a computer workstation to be communicated to another computer workstation and multi-media data originated at another computer workstation forming a communication device is able to be communicated to the computer workstation.

The data is communicated, in the exemplary implementation, selectively with guarantees of service quality, QOS, levels. The different types of data of a multi-media communication service, for instance, each have a service quality level guarantee associated therewith. A sending communication device of multi-media data becomes aware of another communication device by way of a service discovery procedure. In a service discovery procedure, the communication device sends service discovery messages to discover other communication devices of the Ethernet network. Communication devices that receive these service discovery requests, respond thereto to announce their presence. For various reasons, including those discussed above, sometimes sending of service discovery messages throughout the entire Ethernet network is disadvantageous.

The communication network also includes bridges 18. The bridges 18 here is audio/video (A/V) bridging-capable.

During conventional operation of the bridge, physical layer isolation is provided while selectably providing bridging at a data link layer, e.g., logical layer 2. In exemplary operation, the bridge is able to receive/forward messages according to their layer-2 destination address and/or VLAN tags. Service discovery messages generated by the communication devices pursuant to service discovery procedures are forwarded according to their layer-2 tags. Pursuant to operation of an embodiment of the present invention, the bridges control the forwarding of the service discovery messages.

Further pursuant to operation of an embodiment of the present invention, audio/video bridging domains 24 are defined in the Ethernet network by the bridge. Here, FIG. 1 shows a single domain 24. More generally, an Ethernet permits definition of N domains, domains 24-1, 24-2, . . . , and 24-n. While the communication devices 12 of a domain 24 are shown if FIG. 1 as being in physical proximity, the domains are also representative of logical domains, that is, domains formed of logically-connected communication devices irrespective of their physical proximity. A service discovery message generated by a communication device 12 within one domain is detected by the bridge to which the device 12 is directly connected. And, the bridge forwards on the service discovery message to other communication devices within the same domain at which the originating communication device is positioned. The bridge prohibits forwarding on of service discovery messages to other domains, that is, domains other than the domain in which the originating communication device is located. The bridge provides analogous forwarding control over service discovery messages generated in each of the defined domains. Thereby, an originating communication device, that is, a device that originates a service discovery message, is limited to discovering other communication devices in the same domain at which the originating communication device is positioned.

In one exemplary implementation, and as shown, each bridge includes filter functionality, represented by the filter element 28 that conventionally forms part of a bridge and that is representative of the filtering performed by the bridge. Filtering is performed upon received service discovery messages so that the received messages are passed onto other communication devices within the same domain and blocked from passage to communication devices of other domains In one exemplary implementation, and as shown in FIG. 1, a tag 32, an identifier, is associated with each of the communication devices. The tags identify the domain to which the communication device is associated. And, the tag is included in service discovery messages generated by an originating communication device. The bridge ascertains the value of the tag included in a discovery service message and makes forwarding decisions in response thereto. That is to say, the bridge forwards, or elects not to forward, the service discovery messages responsive to the values of the tag in the detected message. The tags are provided to the devices 12 in any of various manners. In one implementation, the bridges broadcast values of the tags, and the devices monitor for the broadcasts. In another implementation, catalogs containing various values, including the values of the tags, are made available to the devices. Additional details related to such an implementation are described in co-pending patent application of Ser. No. 11/539,148, filed on Oct. 5, 2006. And in another implementation, device sends a request to its associated bridge to inquire of the tag, and the bridge replies with the value of the tag.

Figure 2:
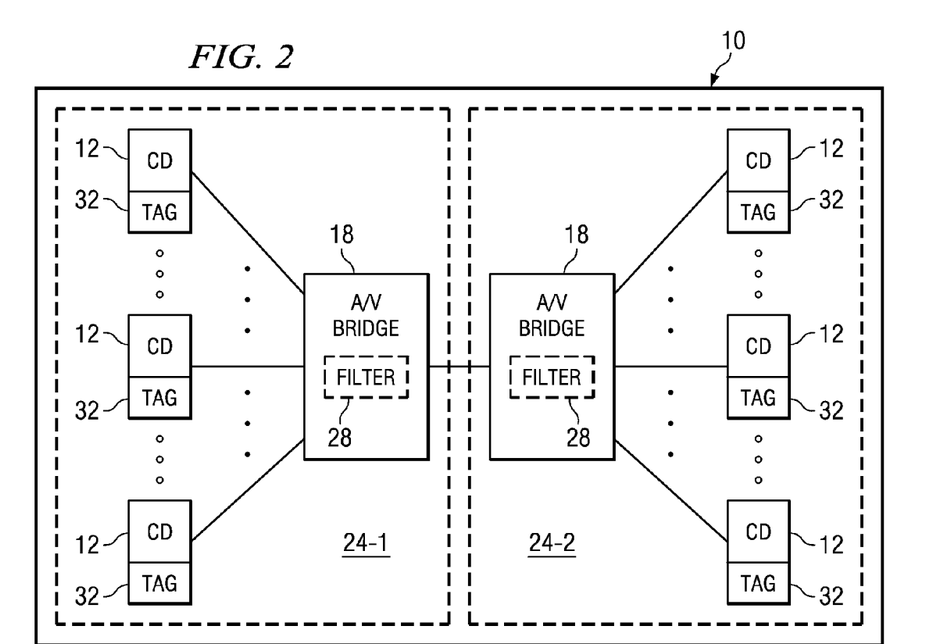
FIG. 2 illustrates a functional block diagram, similar to that shown in FIG. 1, but here representative of further operation of an embodiment of the present invention.

FIG. 2 again illustrates the communication network 10. Again, a plurality of communication devices 12 and the A/V bridge 18 are shown. In the illustration shown in FIG. 2, the domain 24, shown as a single domain is here divided into two domains, domain 24-1 and domain 24-2. The illustration of FIG. 2 represents the capability of an administrator of the bridges of the network to redefine the domains. By redefining the domains, the communication devices to which the service discovery messages generated by an originating communication device can be forwarded are correspondingly changed. Here, the AVB (audio video bridging) domain is decreased in size into two separate domains. When the domain is changed, the tags of the affected communication devices are appropriately changed, all to indicate their association with the single domain out of two domains mentioned above. New tags indicate not the single combined domain, but one of each separated domain.

The domains are redefineable, as desired. For instance, the domains are redefineable into their original configuration shown in FIG. 1 or are configured into a new configuration of domains.

Figure 3:
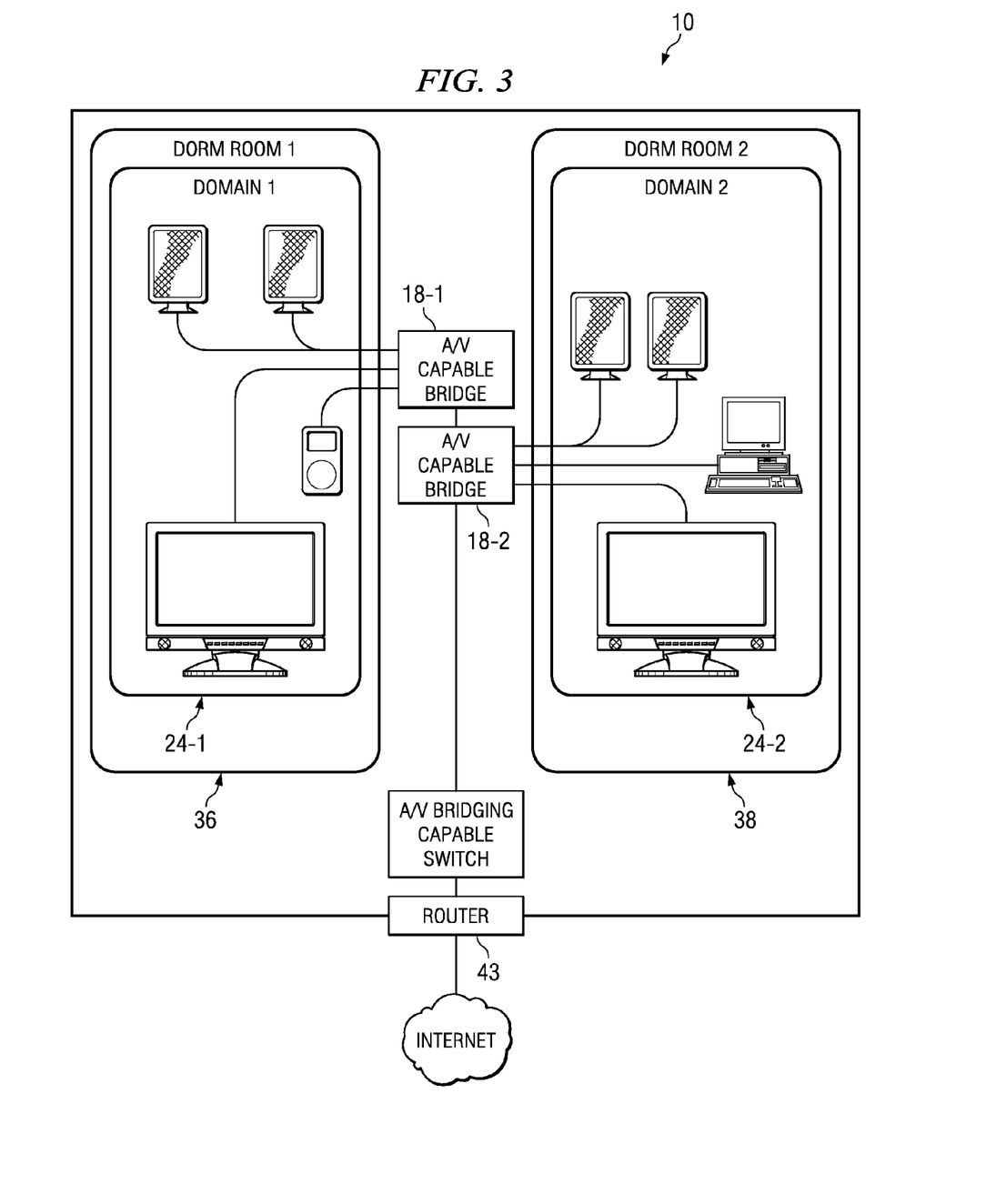
FIG. 3 illustrates a functional block diagram representative of an exemplary implementation of an embodiment of the present invention.

FIG. 3 illustrates an exemplary Ethernet network 10, here installed at a student dormitory. While the Ethernet network is installed throughout the dormitory, domains are defined on a room-by-room basis. A first domain 24-1 is defined as first dormitory room 36, and second domain 24-2 is defined at a second dormitory room 38. That is to say, each dormitory room is configured as one AVB domain.

Communication devices 12 are connected to, and become portions of, the Ethernet network at each of the domains 24 at the locations 36 and 38. In the exemplary example shown in FIG. 3, the communication devices at the first domain 24-1 at the dormitory room 36 include a music player, a video display, and a set of acoustic transducers. And, at the second domain 24-2 at location 38, the communication devices include a computer workstation, a video display, and a set of acoustic transducers. Such devices are directly connected to respective A/V capable bridges that are connected to a switch 40 or a router. The switch 40 is here further shown to be connected to the Internet 42 via a router 43.

Pursuant to operation of an embodiment of the present invention, service discovery messages generated by any of the communication devices positioned at the locations 36 and 38 are forwarded by the bridge 18-1 and 18-2 respectively only to others of the communication devices within the same domain at which the service discovery message originates. The music player positioned at the first domain 24-1, for instance, is permitted to discover only the communication devices at the first domain 24-1. Because the music player does not discover any of the communication devices at the second domain 24-2, play out of music files at an audio/video transducer of the second domain does not occur. Each room is a separate AVB domain.

Other examples provide analogous advantages. In such other examples, the network again is a single Ethernet network connected by way of bridges. When the bridges are AVB-capable, through the definition and formation of AVB domains, service discovery of communication devices sending service discovery messages is limited to other communication devices within the same domain at which the discovery message originates.

Classrooms in a school building, for instance, connected to the network backbone of an Ethernet network, are also divided into individual AVB domains. An education video played out by a video player connected to the Ethernet network in a first classroom is played out on video on audio transducers positioned in that classroom, and not elsewhere. An auditorium of the school, analogously, is also configured as a single AVB domain. Audio output generated by the microphone of a speaker at the auditorium is directed to the speakers at the auditorium.

By way of another example, in a hospital that has an Ethernet network installed, partitioning is performed to define a plurality of AVB domains. Separate AVB domains are defined, for instance, at different medical departments. When a hospital announcement is made, the announcement is limited to specific AVB domains.

A further example with respect to a hospital implementation would be definition of an AVB domain permitting remote viewing of a surgical procedure by students positioned in a particular AVB domain. Merging of separate domains, such as the hospital surgery room and a classroom provides for appropriate service discovery of a video display device by a camera positioned at the surgery room.

Also analogously, conference rooms at business, municipal, and other enterprises are configured as an AVB domain. An attendee at a conference room carrying a laptop computer, or other network-connectable device, is permitted to, e.g., capture a projector image for display upon the laptop computer, or other device, of the attendee.

In a further implementation, similar to tags to define AVB domain, the AVB domains can be defined by group MAC address. Merging of AVB domains also makes use of group MAC (medium access control) address concept similar to such as those defined the IEEE 802.1ak protocol. If group MAC address concept is used to define the AVB domain, then devices that belong to an AVB domain together register to the specific group address that is associated with the given AVB domain. The bridge provides the device the group MAC address which the device registers in a similar way as the bridge provides the domain tag to the device. Therefore, the domain is associated with a group MAC address or tag, according to whichever method is implemented. Then, an originating device sends a service discovery message to a group MAC address that is associated with the AVB domain that the originating device resides. Service discovery message destined to this group MAC address is forwarded on to all devices in the AVB domains that utilize the address. Using the group MAC addresses provides an easy manner by which to combine different AVB domains. Other manners of using existing IEEE protocols permit the definition of different AVB domains.

Figure 4:
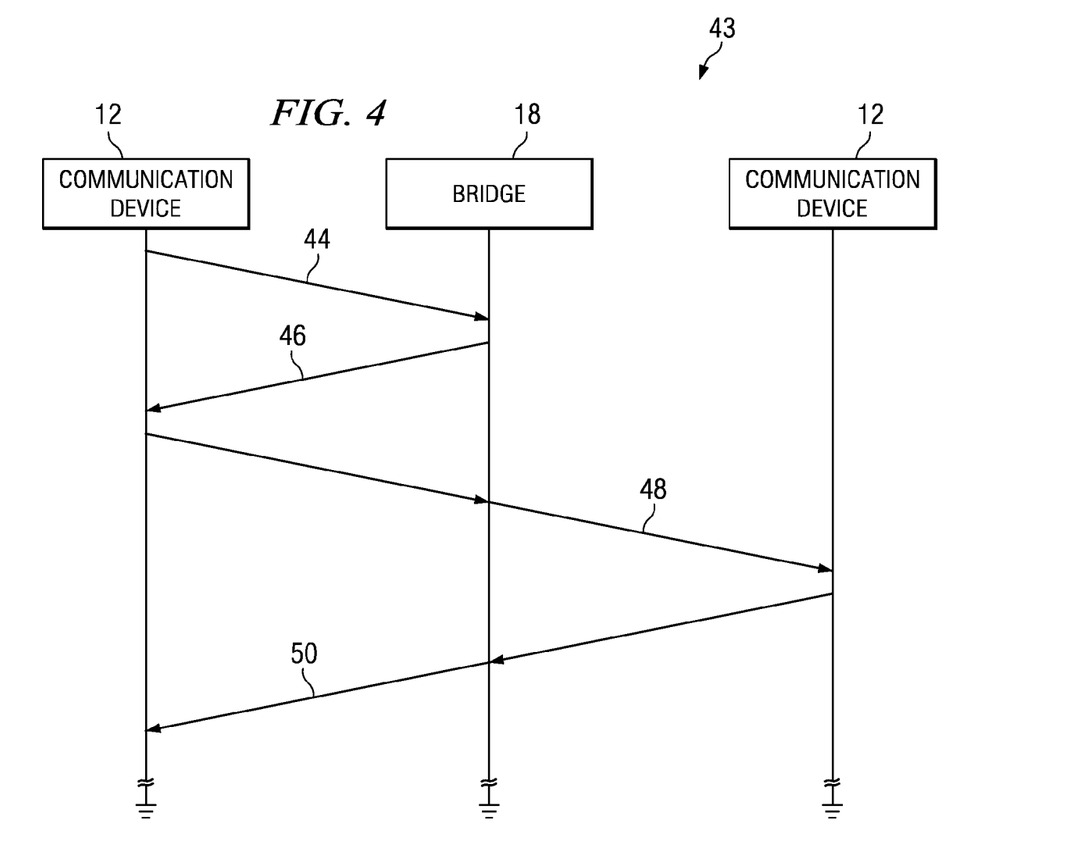
FIG. 4 illustrates a message sequence diagram representative of signaling generated pursuant to operation of an exemplary embodiment of the present invention.

FIG. 4 illustrates a sequence diagram 43 representative of exemplary signaling generated pursuant to an exemplary embodiment of the present invention.

Here, and as indicated by the segment, a device 12 sends a request, indicated by the segment 44, to inquire of its tag. And, as indicated by the segment 46, the bridge provides the device with the value of the tag.

Subsequently, and as indicated by the segment 48, the device generates a service discovery request message. Here, the bridge forwards on the service discovery message on to the second device 12 as the second device 12 is within the same domain as the message-originating device 12. And, the device returns a response, indicated by the segment 50.

Figure 5:
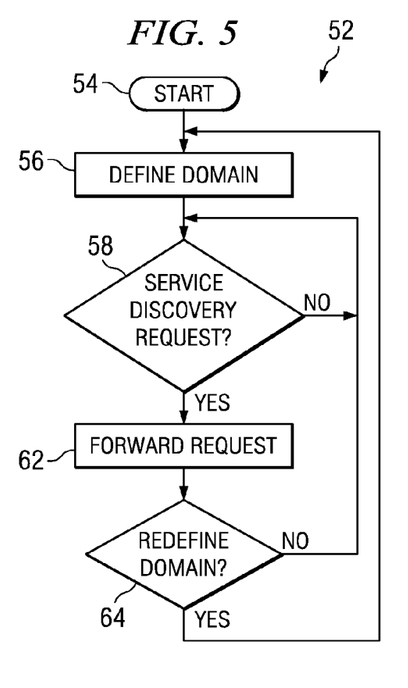
FIG. 5 illustrates a process diagram representative of the process of exemplary operation of embodiment of the present invention

FIG. 5 illustrates a process diagram, shown generally at 52, illustrative of operation at an Ethernet network that shows the capability provided pursuant to an embodiment of the present invention to define and redefine domains within an Ethernet network. Subsequent to entry, indicated by the start block 54, AVB domains are defined, indicated by the block 56. The AVB domains are defined by tags that identify the communication devices as part of, i.e., connected to, a defined domain.

Then, and as indicated by the decision block 58, a determination is made as to whether a service discovery request is generated. If not, a no branch is taken back to the decision block. Otherwise, the s branch is taken to the block 62, and forwarding of the service discovery request is made to communication devices within the defined domain.

Subsequently, a determination is made, indicated at the decision block 64 as to whether a redefinition of the domain, such as merging, or division, of the domain is made. If not, the no branch is taken back to the decision block 58. Otherwise, the yes branch is taken back to the block 56.

Figure 6:
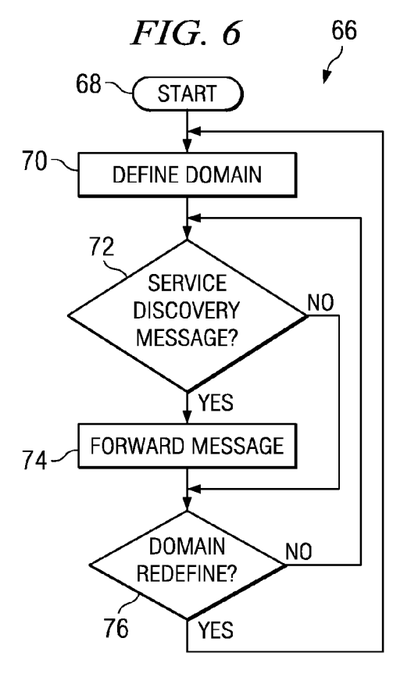
FIG. 6 illustrates another process diagram representative of additional exemplary operation of an embodiment of the present invention.

FIG. 6 illustrates another process, shown here generally at 66, representative of bridge operation pursuant to an embodiment of the present invention.

Subsequent to start, indicated by the block 68, a domain is defined, indicated by the block 70, such as in a manner described previously with a tag or a group MAC address. A determination is then made, indicated by the block 72, whether a received service discovery message is identified as being part of the domain, such as by the identity of the tag or MAC address. If so, then the yes branch is taken to the block 74 and the service discovery message is forwarded to the respective domain. Otherwise, the no branch is taken to the decision block 76. A path is also taken from the block 74 to the decision block 76.

At the decision block 76, a determination is made as to whether the domain has been redefined. If so, the yes branch is taken back to the block 70.

Figure 7:
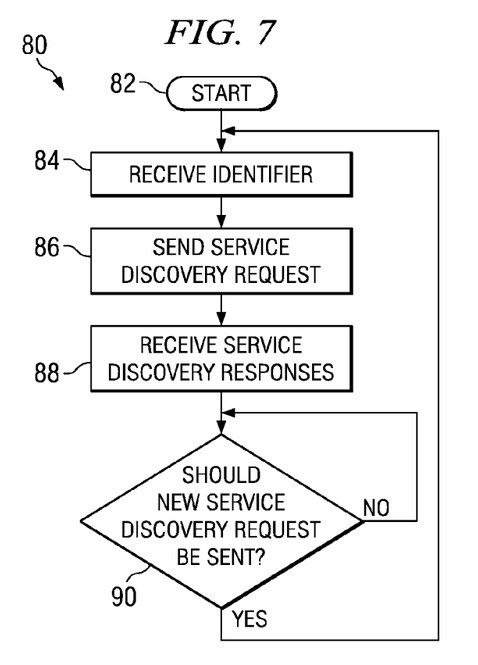
FIG. 7 illustrates another process diagram representative of additional exemplary operation of an embodiment of the present invention.

FIG. 7 illustrates a process diagram, shown generally at 80, representative of operation of an embodiment of the present invention at a device connected to a domain of the network.

Subsequent to start, indicated by the block 82, the identifier to be used by the device is received. The identifier comprises, e.g., a tag or a group MAC address for the bridge. Then, and as indicated by the block 84, the device sends a service discovery request message. And, as indicated by the block 86, the device receives service discovery responses, if any.

Then, a determination is made, at the decision block 90, as to whether a new service discovery request message should be sent. Determination is made, e.g., by expiration of a clock or timer. If not, the no branch is taken back to the decision block. Otherwise, the yes branch is taken to the block 84, and the process continues.

The previous descriptions are of preferred examples for implementing the invention, and the scope of the invention should not necessarily be limited by this description. The scope of the present invention is defined by the following claims.

What is claimed is:

1. A method for relaying multimedia communication data operable in an Ethernet network, comprising:
    defining an audio/video (A/V) domain by a bridge with A/V bridging-capabilities, wherein defining the A/V domain includes transmitting by the bridge an A/V domain identifier of the A/V domain to a set of a plurality of communication devices that are associated with the A/V domain in the Ethernet network;
    receiving a message by the bridge from one of the plurality of communication devices connected to the bridge and determining that the message is a service discovery message to discover other communication devices in the Ethernet network, wherein the service discovery message includes the A/V domain identifier;
    determining the A/V domain identified by the A/V domain identifier in the service discovery message and forwarding the service discovery message to the set of the plurality of communication devices associated with the A/V domain in the Ethernet network and filtering the service discovery message from being forwarded to other of the plurality of communication devices not associated with the A/V domain in the Ethernet network such that only the set of the plurality of communication devices in the Ethernet network associated with the A/V domain may be discovered; and
    in response to detecting the message is not a service discovery message, forwarding the message to one or more of the plurality of communication devices in response to a layer 2 destination address in the message.

2. The method of claim 1, further comprising:
    in response to detecting the message is not a service discovery message and includes a virtual local area network (VLAN) tag, forwarding the message to one or more of the plurality of communication devices in response to the VLAN tag in the message, wherein the VLAN tag is different from the A/V domain identifier.

3. The method of claim 1, wherein the layer 2 destination address in the message is different from the A/V domain identifier.

4. The method of claim 1, wherein the set of the plurality of communication devices that are associated with the A/V domain are located at a first physical location.

5. The method of claim 1, wherein the set of the plurality of communication devices that are associated with the A/V domain are located at a plurality of different physical locations.

6. The method of claim 1, further comprising:
    redefining the A/V domain by the bridge with A/V bridging-capabilities, wherein redefining the A/V domain includes transmitting the A/V domain identifier of the A/V domain to another set of the plurality of communication devices and wherein the A/V bridging-capabilities include support of communication of audio video streams with quality of service guarantees defined in IEEE 802.1 standards.

7. The method of claim 1, wherein the A/V domain identifier includes a group Medium Access Control (MAC) address.

8. The method of claim 1, wherein the A/V domain identifier that identifies the A/V domain is a group MAC address.

9. The method of claim 1, wherein the A/V domain identifier includes a tag with the A/V domain.

10. A bridge with audio/video (AN) bridging-capabilities in an Ethernet network, comprising:
    a filter in the bridge operable to:
        receive a message from one of a plurality of communication devices connected to the bridge;
        detect that the message is a service discovery message, wherein the service discovery message includes an A/V domain identifier;
        determine the A/V domain identified by the A/V domain identifier in the service discovery message and forward the service discovery message to a set of the plurality of communication devices associated with the A/V domain in the Ethernet network;
        filter the service discovery message from being forwarded to other of the plurality of communication devices not associated with the A/V domain in the Ethernet network; and
        detect that the message is a different type of message than a service discovery message, forward the message in response to a layer 2 destination address in the message that is different from the A/V domain identifier.

11. The bridge of claim 10, wherein the bridge is operable to:
    define the A/V domain by transmitting the A/V domain identifier of the A/V domain to the set of the plurality of communication devices that are associated with the A/V domain.

12. The bridge of claim 11, wherein the bridge is further operable to:
    in response to detecting the message is not a service discovery message, forward the message to one or more of the plurality of communication devices in response to a virtual local area network (VLAN) tag in the message.

13. The bridge of claim 11, wherein the set of the plurality of communication devices that are associated with the AN domain are located at a first physical location.

14. The bridge of claim 11, wherein the set of the plurality of communication devices that are associated with the A/V domain are located at a plurality of different physical locations.

15. The bridge of claim 11, wherein the bridge is further operable to:
    redefine the A/V domain by transmitting the A/V domain identifier of the A/V domain to another set of the plurality of communication devices.

16. The bridge of claim 11, wherein the A/V domain identifier includes a group Medium Access Control (MAC) address.

17. The bridge of claim 11, wherein the A/V domain identifier includes a tag that identifies the A/V domain.

18. The bridge of claim 17, wherein the service discovery message includes the tag with the A/V domain identifier.

19. A communication device in an Ethernet network, comprising:
    a bridge with audio/video (AN) bridging-capabilities operable to:
        receive a message from one of a plurality of other communication devices in the Ethernet network;

determine whether the message is a service discovery message;

when the message is a service discovery message, determine an A/V domain identified by an A/V domain identifier in the service discovery message and forward the service discovery message to a set of the plurality of communication devices associated with the A/V domain in the Ethernet network and filter the service discovery message from being forwarded to other of the plurality of communication devices not associated with the A/V domain in the Ethernet network; and when the message is a different type of message than the service discovery message, forward the message in response to a layer 2 destination address in the different type of message.

20. The communication device of claim 19, wherein the A/V domain identifier includes at least one of: a tag and a group MAC address; and wherein the A/V domain identifier is different than the layer 2 destination address in the different type of message.

\* \* \* \* \*